May 27, 1969 A. F. STAMM 3,445,911
METHOD OF MAKING TAPERED SPRING LEAF
Filed Aug. 22, 1966 Sheet 1 of 3
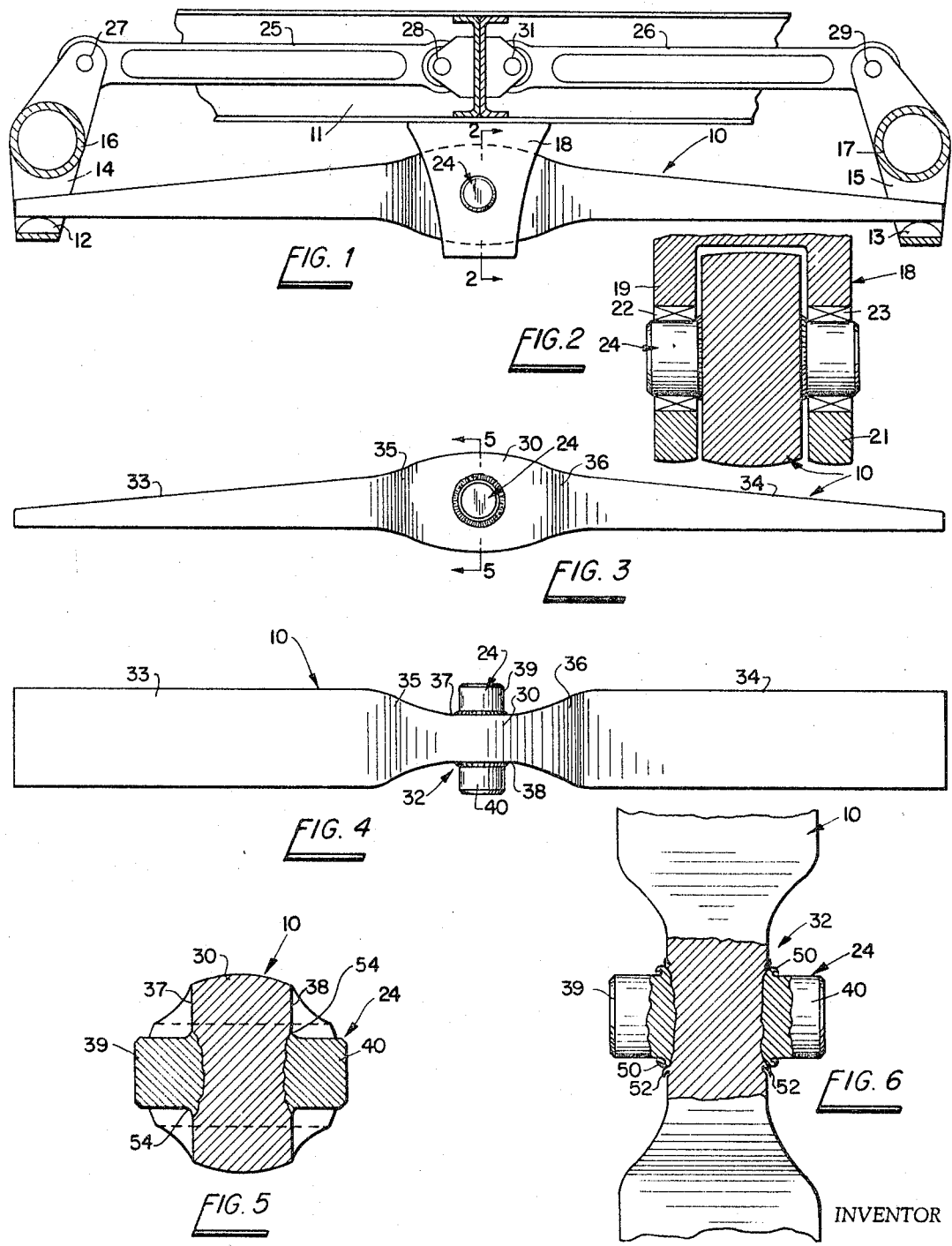
INVENTOR
Alex F. Stamm
BY
Strauch, Nolan, Neale, Nies & Bronaugh
ATTORNEYS May 27, 1969        A. F. STAMM        3,445,911
METHOD OF MAKING TAPERED SPRING LEAF
Filed Aug. 22, 1966        Sheet 2 of 3
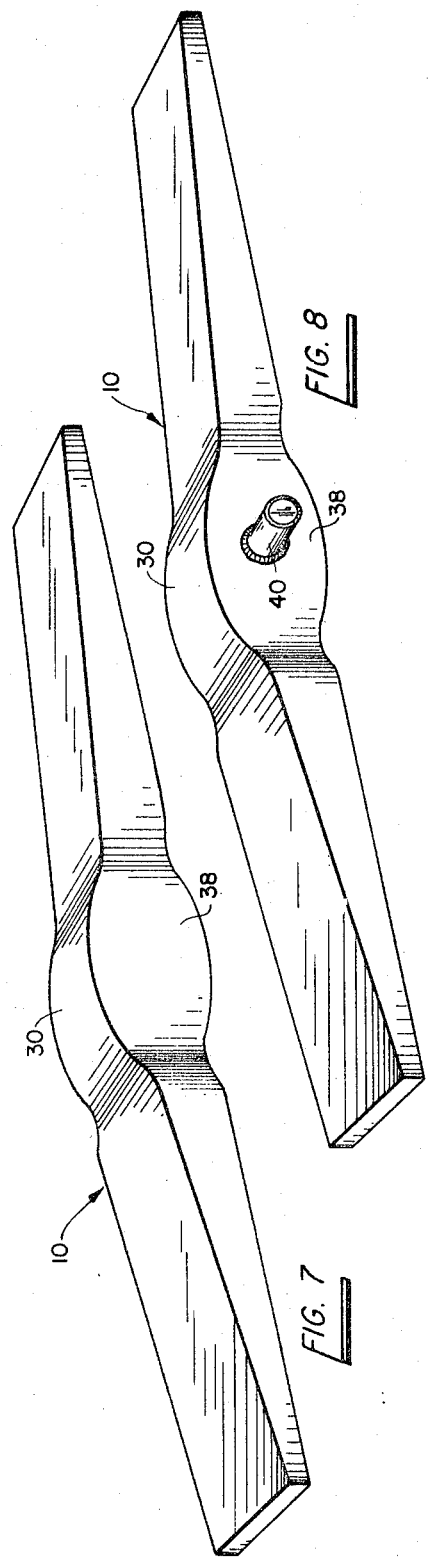
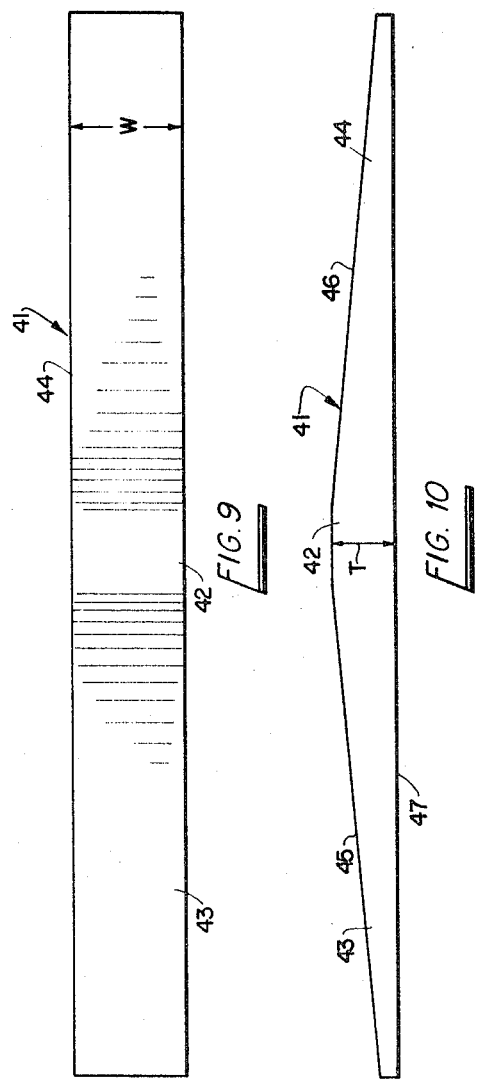
INVENTOR
Alex F. Stamm
BY
*Strauch, Nolan, Neale, Nies & Bronaugh*
ATTORNEYS May 27, 1969 A. F. STAMM 3,445,911

METHOD OF MAKING TAPERED SPRING LEAF

Filed Aug. 22, 1966 Sheet 3 of 3

INVENTOR

Alex F. Stamm

BY

Strauch, Nolan, Neale, Nies & Bronaugh

ATTORNEYS

United States Patent Office 3,445,911
Patented May 27, 1969

3,445,911
METHOD OF MAKING TAPERED SPRING LEAF
Alex F. Stamm, Rochester, Mich., assignor to North American Rockwell Corporation, a corporation of Delaware
Filed Aug. 22, 1966, Ser. No. 574,200
Int. Cl. B21f 35/00
U.S. Cl. 29—173                     6 Claims

ABSTRACT OF THE DISCLOSURE

A method of making a vehicle spring beam comprising forming a steel beam of constant width from end to end and a relatively thick center portion from which the opposite ends taper toward the ends in decreasing cross section, laterally compressing the beam center portion to reduce the width of the beam at that region while retaining the beam width in the remainder of the beam and to displace metal to materially increase the thickness of the center portion, and welding axially aligned trunnion pins upon the beam at opposite sides of the thickened center portion.

---

This invention relates to leaf spring suspensions for motor vehicles and more particularly to the method of making a heavy duty spring leaf having a special center structure enabling it to be transversely pivoted, as may be required for equalizer beam and suspension applications.

The spring leaf of the invention is of constant width and is decreasingly tapered from a maximum thickness center portion toward both ends, and the thick center portion has trunnion pin ends welded to opposite sides thereof. The center portion is reduced transversely of the longitudinal axis of the leaf in one embodiment to displace metal sufficiently to provide a sufficient thickness region for mounting the trunnion and in the form of the invention described as the specific embodiment of FIGURES 1–8 herein, the trunnion comprises opposite pin ends welded onto opposite sides of the restricted beam center portion. In the embodiment of FIGURES 11–14 the beam is reduced in width and the flat side faces formed by machining. In the copending related application of Nelson R. Brownyer Ser. No. 574,193 filed of even date herewith the trunnion is a pin pressfitted into a transverse bore formed in the narrowed thickened center portion of the beam.

Beams for vehicle suspensions have been proposed, these usually comprising a rigid steel member centrally pivoted on the frame and mounted in resilient bearings or ball and socket joints at the axle connected ends. These beams were primarily provided to transfer driving and braking torque reactions to the frame and link the axles together in fixedly spaced relation longitudinally of the vehicle, and they added undesirably to the unsprung dead weight of the vehicle. To resiliently support the vehicle load and absorb road shocks, large multileaf spring assemblies were used in conjunction with such rigid beams.

The present invention provides a novel resilient load supporting beam to form the suspension where it serves most of the combined functions of the combination rigid beam and multileaf spring assemblies. The dead weight of the suspension is thus greatly reduced, increasing the load carrying capacity of the vehicle. Less space is needed for installation than for the more complex conventional constructions.

The resilient beam of this invention is in effect a heavy tapered spring leaf having a thicker central portion with welded-on trunnion pin ends rigidly projecting from opposite sides of that center portion, and it is a major object of the invention to provide a novel method of making such a beam.

A further object of the invention is to provide a novel method of making a resilient beam wherein a tapered leaf spring of constant width if formed as by rolling or flame cutting from bar stock, and wherein the central portion thereof is laterally reduced by a mechanical operation that displaces metal to materially increase the thickness of said center portion, and then trunnion pin ends are permanently secured as by welding to project from opposite sides of said central portion.

Other novel features will appear as the following detailed description proceeds with reference to the accompanying drawings in which:

FIGURE 1 is a side elevation illustrating a spring beam of the invention installed in a representative suspension;

FIGURE 2 is a section through line 2—2 of FIGURE 1;

FIGURE 3 is a side elevation showing a spring beam apart from the assembly;

FIGURE 4 is a top plan view of the beam of FIGURE 3;

FIGURE 5 is a section through the spring beam substantially along line 5—5 of FIGURE 3;

FIGURE 6 is a top view of the central portion of the spring beam with portions thereof cut away and shown in section illustrating the trunnion pin structure after opposed pins are friction welded onto opposite sides of the beam and before the flash is ground off;

FIGURE 7 is a generally perspective view of the spring beam before welding on the trunnion pins;

FIGURE 8 is a generally perspective view of the spring beam after the trunnion pins have been welded thereto;

FIGURES 9 and 10 are respectively plan and side elevation views showing the beam of FIGURES 1–8 in a preliminary form.

Figure 11:
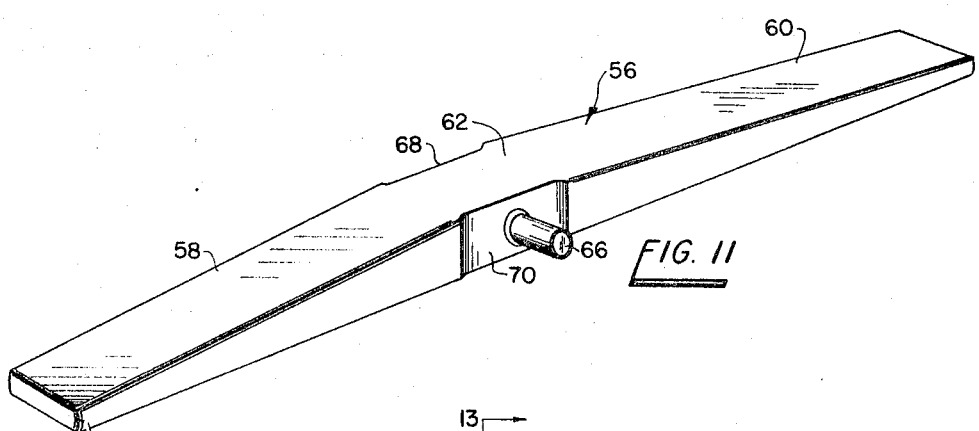
FIGURE 11 is a generally perspective view of another spring beam having trunnion pins welded on opposite sides.

Spring beam 10 is shown in FIGURE 1 in a representative vehicle suspension installation. A beam 10 at each side of the vehicle is centrally pivoted on the frame 11 and the beam ends rest slidably on suitable wear pads 12 and 13 provided on brackets 14 and 15 rigid with tandem axle housings 16 and 17 respectively.

The frame support of beam 10 comprises a depending trunnion bracket 18 rigid with frame 11, and bracket 18 as shown in FIGURE 2 has depending arms 19 and 21 mounting bearings 22 and 23 respectively supporting opposite ends of trunnion means 24 rigid with beam 10.

The ends of spring beam 10 may be notched and supported in brackets 14 and 15 in the pivot block arrangements disclosed in Bixby et al. Patent No. 2,999,695.

Torque rods 25 and 26 extend between axles 16 and 17 respectively and the vehicle frame. Rod 25 has conventional pivot connections to axle 16 at 27 and to the frame at 28. Rod 26 has conventional pivot connections to the axle 17 at 29 and to the frame at 31. These torque rods function to maintain the tandem axle spacing longitudinally of the vehicle, and to transmit brake and drive torque reactions directly to the frame.

Beam 10 is made of a good grade of spring steel. As shown in FIGURE 4 the beam is of constant width from end to end except for a laterally restricted central waist portion 32. As shown in FIGURES 3 and 4, the beam 10 at the middle of waist portion 32 is a uniform width section 30 of materially greater thickness than the opposite end sections 33 and 34 which are tapered and gradually reduce in thickness toward the beam ends. The thickest section 30 is integrally connected to the constant width end sections 33 and 34 by transition sections 35 and 36 which, as shown in FIGURES 3 and 4, are of gradually changing width and thickness and merge smoothly at opposite ends into the adjoining beam sections.

The thickest beam section 30 is formed with opposite flat parallel sides 37 and 38, and identical cylindrical trunnion pin ends 39 and 40 are permanently secured as by welding onto sides 37 and 38 in permanent axial alignment. The axis of trunnion means 24 which comprises pin ends 39 and 40 is perpendicular to the length of beam 10, and the pin ends extend only slightly outwardly of the width of the beam.

Beam 10 is preferably made by first taper rolling and treating a length of steel stock according to the method disclosed in Greene et al. Patent No. 3,238,072 using for example the taper rolling machine of Krause Patent No. 3,145,591 for the taper rolling operation. This produces a spring beam 41 of constant width W having a thicker center section 42 of thickness T from which taper the opposite end sections 43 and 44 as shown in FIGURES 9 and 10. The surfaces 45 and 46 are taper rolled, and the surface 47 is straight from one end of the spring to the other.

Optionally the constant width tapered spring beam of FIGURES 9 and 10 may be formed by flame cutting from bar stock as disclosed and claimed in the copending application of Willard F. Perdue et al., Ser. No. 578,607, filed Sept. 12, 1966, where heavy duty spring beams not conveniently taper rolled are required.

After the spring beam 10 has been formed to the condition shown in FIGURES 9 and 10, the central portion 42 of the beam is hot forged in a hydraulic press exerting pressure in a horizontal direction transverse to the longitudinal axis of the beam from both sides of the beam towards the central axis theerof to form the restricted waist section 32 of FIGURE 4 which is of materially decreased width and increased thickness relative to the remainder of the beam. By this operation metal is displaced vertically to form the thickest center section 30 and the transition sections 35 and 36.

Preferably the pins 39 and 40 are friction welded to the opposite sides of the beam center portion. This is done by holding the beam of FIGURE 7 stationary in a suitable jig and rotating axially aligned pins 39 and 40 while they are held under considerable axial pressure against the beam side faces at 37 and 38.

With specific reference to FIGURES 5 and 6 the trunnion pins 39 and 40 when friction welded to beam faces 37 and 38, respectively, produce a row of flash 50 around the pins and related similar flash 52 on the beam sides. This flash is squeezed out metal curled over at its rim as is typical in weld seams produced by friction welding. To further increase the strength of the welding bond in these areas the flash 50 and 52 is carefully ground off down to the fused region to provide a smooth integral radius 54 at the intersection of the pins with the leaf sides shown in FIGURE 5 and it will be noted that this radius effectively provides an increased root diameter for the pins 39 and 40 since the friction welding integrally unites the pins with the beam 10.

The steps of grinding the beam surfaces, shot peening the ground surfaces at the tension side of the spring beam, and bulldozing disclosed in said Letters Patent No. 3,238,-072 may be performed before or after the formation of waist section 32.

The restricted waist section 32 may allow a slight diagonal flexing of beam 10 when the suspension is diagonally articulated, which may be advantageous to reduce bearing loads. The trunnion pins greatly facilitate handling of the relatively heavy spring beam 10 for in-shop transporting and during shipment.

The flats at 37 and 38 provided by the center portion provide sufficient area for trunnion pins to be welded on without materially weakening this area. The redistribution of metal effected by the formation of waist section 32 provides an integral cross section of sufficient strength for adequate trunnion pin support, and the lateral restriction of the waist section 32 enables bracket 18 to be narrower and provide adequate support for the beam while reducing the bracket size and weight. As shown in FIGURE 6, the trunnion pin ends lie substantially within the lateral bounds of the width of the beam, so that a compact arrangement results.

Figure 12:
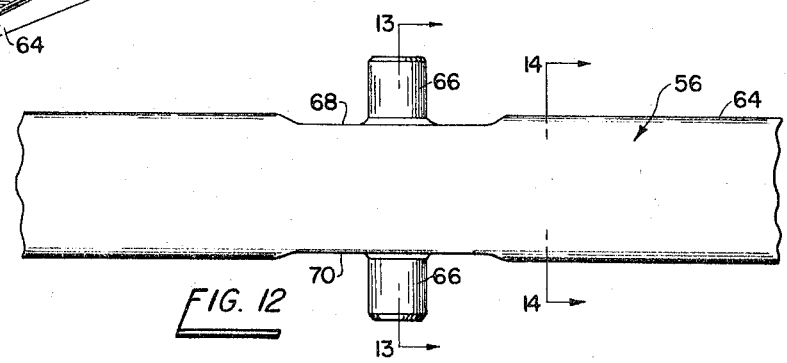
FIGURE 12 is a fragmentary top view of the center portion of the spring in FIGURE 11.
Figures 13, 14:
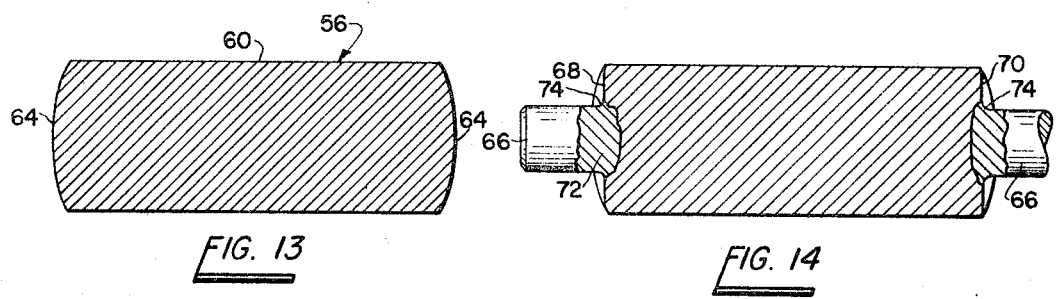
FIGURE 13 is a section through the spring leaf substantially along line 13—13 in FIGURE 12.
FIGURE 14 is a section through the trunnion area substantially along line 14—14 in FIGURE 12.

FIGURES 11 to 14 illustrate a further embodiment of the invention consisting of a tapered spring leaf or beam 56 which may have previously been produced by the same methods and apparatus as the beam of FIGURES 9 and 10.

Beam 56 comprises tapered surfaces 58 and 60 converging from the ends of the beam towards the center portion 62 of maximum thickness. The edges 64 of the spring beam are usually rounded off as shown.

The rounded side edges 64 on both sides of the beam center portion are machined flat, that is, perpendicular to the length of the spring beam to provide parallel flat side faces 68 and 70 which extend approximately over the entire maximum thickness of the center section 62.

Trunnion pins 66 are friction welded onto flat side faces 68 and 70 to provide homogeneous weld regions indicated at 72, and the flash produced at the weld regions is ground off to provide a smooth radius 74 at the base of each trunnion pin 66. Friction welding of the trunnion pins 66 produces an integral bond structure between the spring leaf and the pins as strong as if the trunnion pins were formed directly from the steel of the spring leaf.

The present invention may be embodied in other forms without departing from the spirit and essential characteristic thereof, therefore, the present embodiments are considered in all respects as illustrative only and not restrictive, the scope of the invention being indicated by the appended claims rather than by the foregoing description.

What is claimed and desired to be secured by Letters Patent is:

1. The method of making a spring beam which comprises the steps of forming a steel beam that is of substantially constant width from end to end and has a relatively thick center portion from which the opposite ends taper in decreasing cross section, mechanically working said center portion of the beam to reduce the beam width at that region and forming flat parallel side faces on opposite sides of the center portion of said beam that are spaced apart less than the width of said beam while substantially retaining the beam width in the remainder of the beam, and welding axially aligned transverse trunnion pins upon said beam at said faces.

2. The method defined in claim 1 wherein said trunnion pins are friction welded to said beam.

3. The method of making a spring beam which comprises the steps of forming a steel beam that is of substantially constant width from end to end and has a relatively thick center portion from which the opposite ends taper in decreasing cross section, laterally compressing the center portion of said beam to reduce the width of the beam at that region and form opposite parallel side faces at said center portion while retaining the beam width in the remainder of the beam and to displace metal to materially increase the thickness of said center portion, and welding transverse trunnion pins onto said beam at said faces.

4. The method defined in claim 1 wherein said trunnion pins are friction welded to said beam.

5. The method defined in claim 1, wherein said center portion of the beam is reduced in width by lateral compression which displaces metal to further increase the beam thickness at that region.

6. The method defined in claim 1, wherein the width of said beam center portion is reduced and said flat side faces formed by machining.

References Cited

UNITED STATES PATENTS

| | | | |
|---|---|---|---|
| 1,959,027 | 5/1934 | Hemstreet | 29—173 X |
| 2,779,998 | 2/1957 | Bailey | 29—470.3 |
| 3,204,944 | 9/1965 | Brownyer | 29—173 X |
| 3,238,072 | 3/1966 | Greene et al. | 267—47 |

THOMAS H. EAGER, *Primary Examiner.*

U.S. Cl. X.R.

29—155, 470.3, 475; 267—47